No. 51,279. PATENTED NOV. 28, 1865.
J. R. JOHNSON & J. A. HARRISON.
APPARATUS FOR TAKING PHOTOGRAPHIC PANORAMIC VIEWS.
4 SHEETS—SHEET 2.
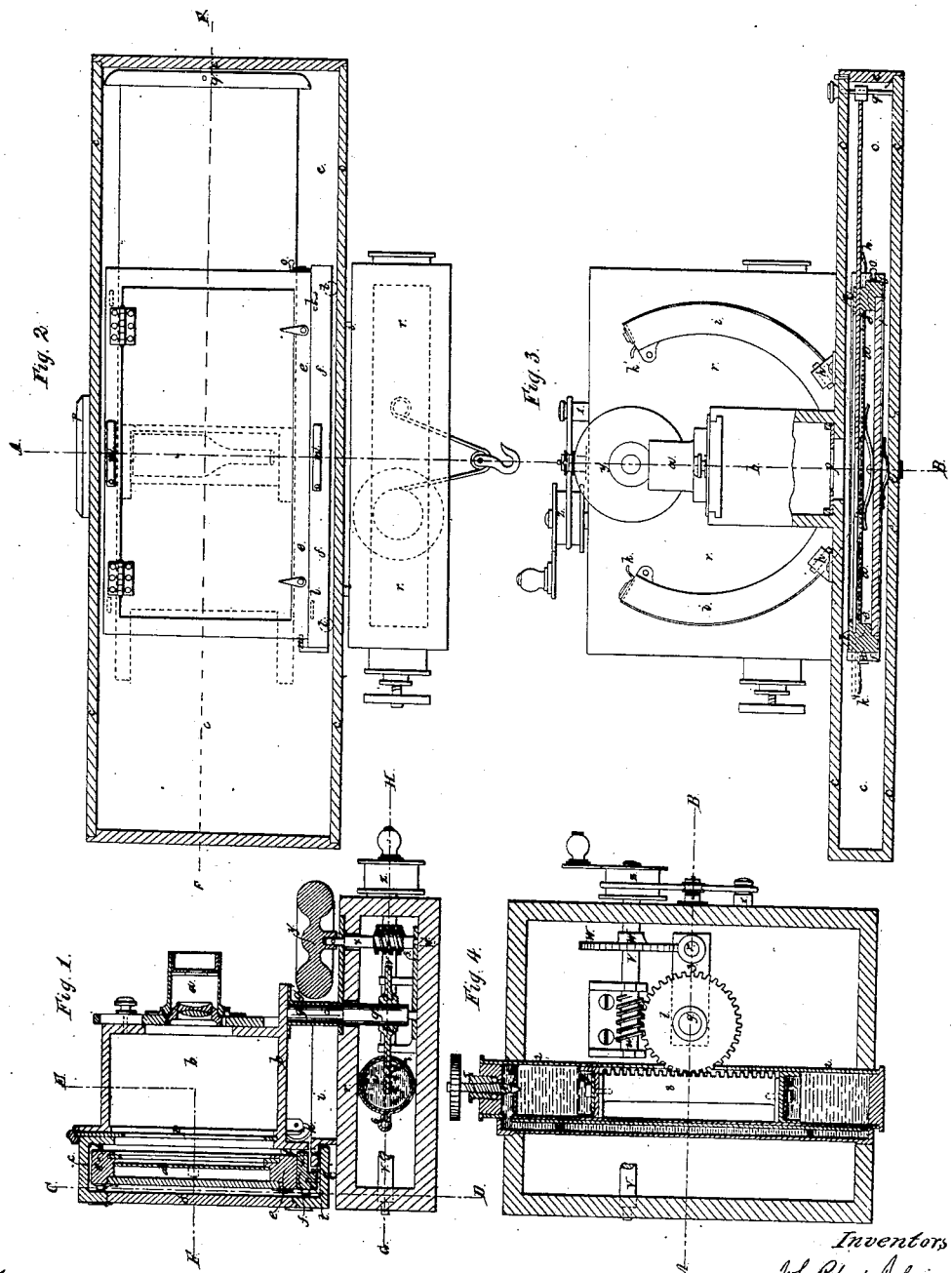

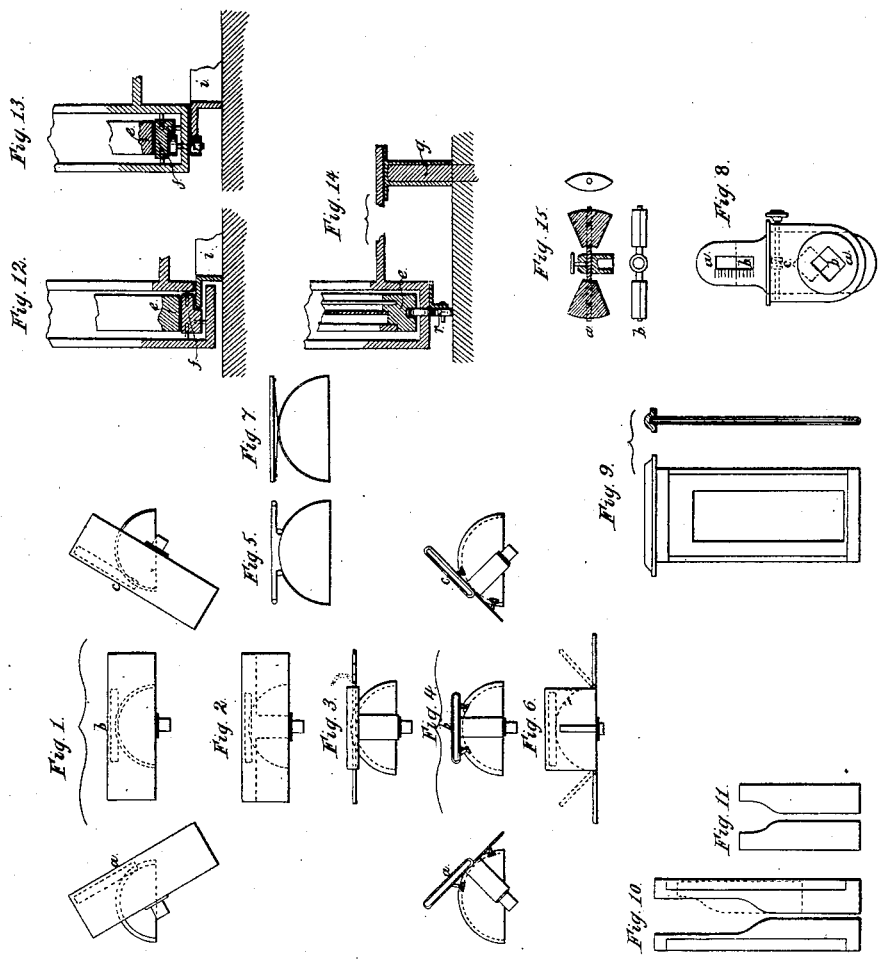

No. 51,279. PATENTED NOV. 28, 1865.
J. R. JOHNSON & J. A. HARRISON.
APPARATUS FOR TAKING PHOTOGRAPHIC PANORAMIC VIEWS.
4 SHEETS—SHEET 3.
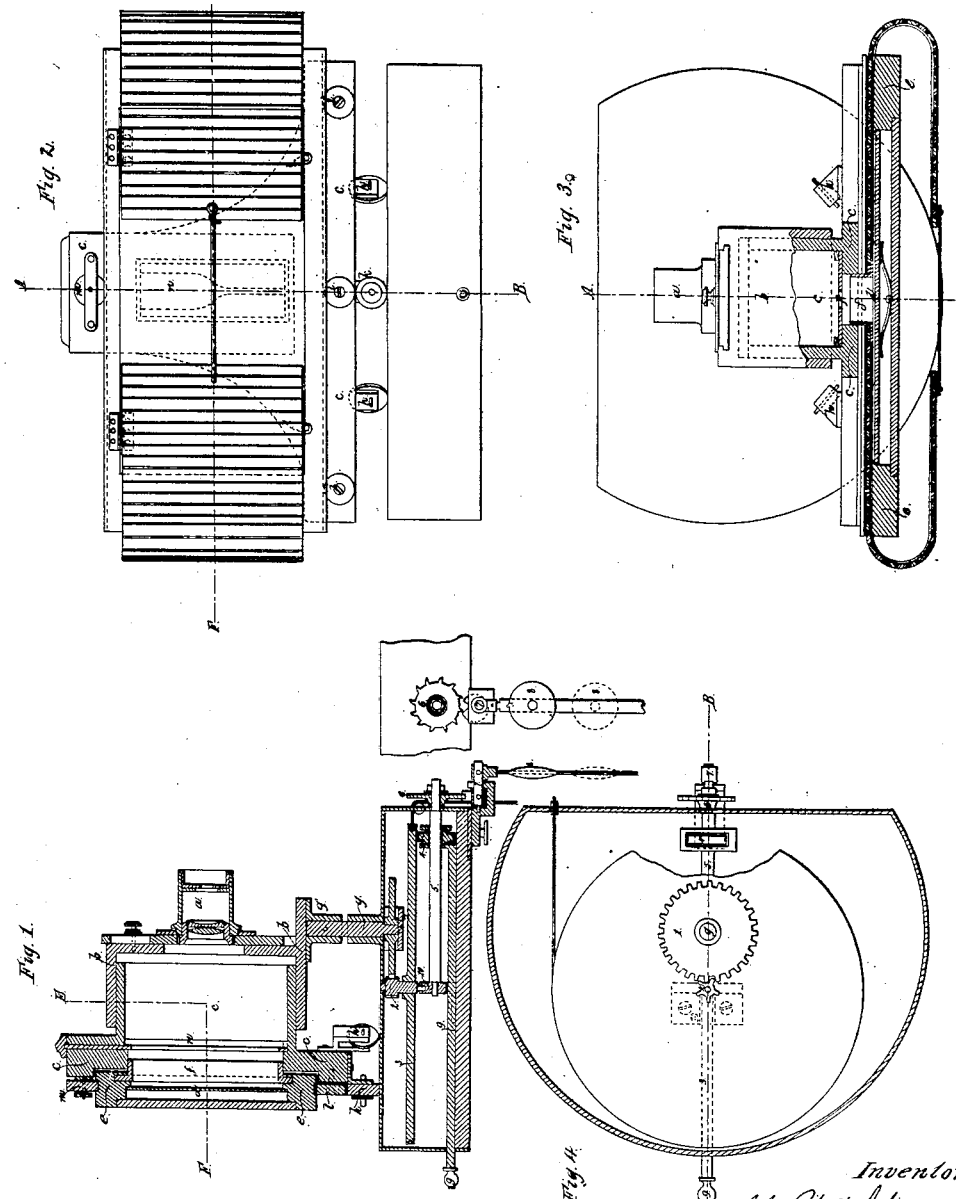

No. 51,279. PATENTED NOV. 28, 1865.
J. R. JOHNSON & J. A. HARRISON.
APPARATUS FOR TAKING PHOTOGRAPHIC PANORAMIC VIEWS.
4 SHEETS—SHEET 4.
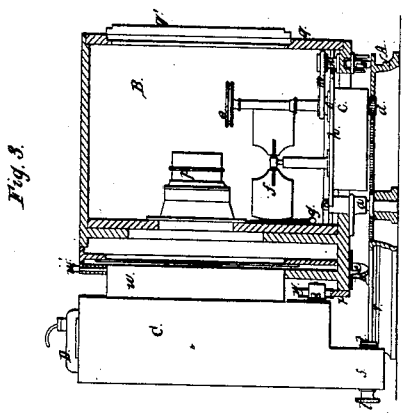
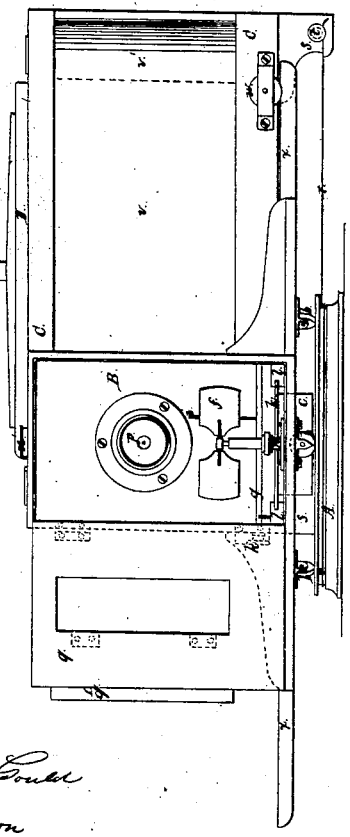
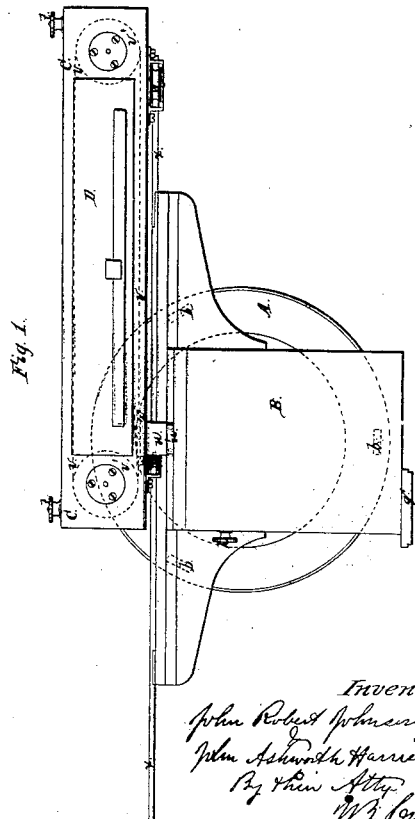

UNITED STATES PATENT OFFICE.

JOHN ROBERT JOHNSON AND JOHN ASHWORTH HARRISON, OF LONDON, ENGLAND.

APPARATUS FOR TAKING PHOTOGRAPHIC PANORAMIC VIEWS.

Specification forming part of Letters Patent No. 51,279, dated November 28, 1865.

*To all whom it may concern:*

Be it known that we, JOHN ROBERT JOHNSON and JOHN ASHWORTH HARRISON, of No. 3 Red Lion Square, London, have invented certain Improvements in Apparatus for Taking Photographic Panoramic Pictures; and we do hereby declare that the following, when in connection with the drawings which accompany and form part of this specification, is a description of our invention sufficient to enable those skilled in the art to practice it.

Our invention consists of certain improvements in the apparatus for taking photographic panoramic pictures.

It is well known that if a photographic lens be mounted vertically upon a pivot the center of which corresponds with a vertical line passing through the axis—that is, the optical center of the lens—and if such lens be made to turn upon the pivot, the images of the objects which are brought in succession in front of the lens during its revolution may be projected upon a screen placed behind the lens, and if such screen be part of a sphere or (for practical purposes) a cylinder the radius of which is equal to the local length of the lens for the images so projected, and the center of which coincides with the center of the pivot upon which the lens turns, such images are true representations of the objects, and remain stationary upon the screen notwithstanding the motion of the lens. Cameras thus constructed have been used for producing panoramic pictures upon curved daguerreotype-plates. It is also known that if, instead of the curved plate for receiving the images, a flat plate be employed, and if, while the lens and the base upon which it is mounted and which carries the plate revolve, the plate be made to traverse in the opposite direction with due relation to the rotation of the lens, the images projected upon the plate are likewise stationary, and are for practical purposes sufficiently sharp and defined, provided that but a narrow portion of the plate is used at one time, (as the true images are projected upon a curved surface and the plate is only a tangent to that curve,) and cameras formed upon this principle have been suggested for the production of panoramic views, but so far as we are informed have not come into practical use. Now, the object of our invention is to render both of the above-mentioned forms of camera fit for use with the modern processes of photography.

Our improvement consists, first, of an improved construction and arrangement of the parts of the flat-plate camera, so that their motions are smooth and equable and free from vibration, and so that the whole apparatus is rendered more compact and portable than those previously seggested; second, of a new mode or modes of obtaining the relative positions of the lens and sensitive plate, such motion being obtained directly by mechanical means or by appliances constructed mechanically instead of by guide curves or grooves formed by trial, as has heretofore been proposed to be done; third, of an improvement in the gearing when working both forms of camera; fourth, of the application of a spring or weight to give motion to such cameras, and of means for regulating such motion both at variable and invariable rates; fifth, of the application of an expanding diaphragm to regulate the exposure in cameras moving at an invariable rate; sixth, of an expanding diaphragm to be placed betweeen the lens and the sensitive plate, by means of which sky and clouds effects may be obtained, and by which the amount of exposure may also be regulated.

In effecting our first improvement we render the camera symmetrical and duly balanced by placing the lens in its center instead of at one side, and placing the rollers or other supports upon which it rotates at equal distance on each side of the center and upon the circumference of a circle whose center coincides with the center of the pivot upon which the apparatus turns, so that the space traveled over by the rollers is equal, and the resistance therefore equal.

In our simplest but least compact form of camera the plate-holder slides within the camera instead of through its side. In this form it is an oblong box somewhat broader than the focal length of the lens, and of a length varying with the angle of the view to be taken. For the whole horizon the length must be somewhat more than six times the length of the focus of the lens, for one-third, somewhat more than twice that length. It is supported by a bed or plate, upon which the rollers fixed to the camera revolve, and in which the pivot around which it revolves is fixed.

Plate 1, Figure 1, shows the outline, in plan, of a camera taking a view of one-third of the horizon in three phases of its course—that is, at the beginning, middle, and end of its motion. The dotted lines indicate the position of the plate-holder and the inner circle of dots the space traversed by the rollers upon the semicircular supporting-bed. It will be seen from this diagram the whole apparatus has a movement of rotation round the pivot placed under the center of the lens upon the fixed bed-plate, while the plate-holder has a movement of translation from one end of the camera to the other. Only the outline of the camera is here shown. Such a formed camera must have a narrow tube or box behind the lens within the camera to confine the rays of light to but a small part of the plate. Such box must, however, be equal to the sensitive plate in height. We render the camera lighter and more compact by dispensing with the vacant space, as shown in Fig. 2, the dotted lines indicating the condensed form. The camera proper then assumes very small dimensions, the necessary length for the traverse of the plate-holder being obtained by a tube or narrow box attached to the back of the small camera. The tube or box alluded to in describing Fig. 1 can then be dispensed with, the angle at which the lateral rays impinge upon the plate being determined by the size of the opening in a partition or diaphragm placed between the camera proper and the tube on which the plate-holder slides. The weight of the instrument may be further reduced by substituting a plate or thin board for the tube first described. The plate-holder slides upon this plate or board, which acts at the same time as a dark-slide. (See Fig. 3.) We still further limit the dimensions of the apparatus by shortening the plate just described and letting the plate-holder overhang or extend beyond the plate or board forming the back of the camera when the latter is at each end of its course, in which case some provision must be made to shut out the light in addition to the back plate, which serves for that purpose, in the form shown by Fig. 3. This may be effected by a strip of india-rubber cloth, oiled silk, or other flexible opaque material passing over rollers at each end of the slide; or an approximation to flexibility may be made by forming the slide of a rigid material in separate parts joined together by hinges or their equivalent, (see the dotted lines in Fig. 3;) or the back board of the camera may be formed of several parts, which are joined together when the camera is in use, but which are separated when the instrument is packed. We have shown the flexible cloth or jointed board applied to shut out the light upon the dark-slide or plate-holder itself, but the same effect may be obtained by passing the flexible cloth over a box in which a dark-slide may be dropped, as in an ordinary camera. The cloth and box remain attached to the camera when the dark-slide is removed after exposure.

The box, fitted with the flexible cloth or hinged board, may be extended in width until it embraces the camera itself, which may then be a thin tube about an inch wide and as high as the picture to be taken. This is attached behind the lens within the box, the lens being fixed to the joined board in front of the camera. The lens and board are of course fixed upon the pivot under the center of the lens and have a movement of rotation only, while the box which contains the plate-holder slides laterally upon the board in front. Fig. 6 gives the outline of such an apparatus, which is efficient, provided the tube at the back be not a parallel tube conveying a mere streak of light perpendicular to the face of the lens, but be of such height that the rays may diverge from the lens vertically, so as to cover the plate, but be confined laterally to fulfill the conditions of the flat-plate camera already described. It is, however, less compact and portable than the preceding forms. The relative motion of the plate to the rotary motion of the lens and camera in these forms of the apparatus, in which the plate-holder is outside or in which it is contained in a sliding box, may be obtained by rollers upon the ends of the plate-holder or box acting upon properly-constructed curves, formed of metal or other resisting material, fixed upon a table or bed-plate which supports the moving parts. Such curves are the involutes of a circle the radius of which is equal to the focus of the lens employed, and may be formed mechanically instead of by trial or experiment. Such motion may, however, be obtained directly and more advantageously from a fixed toothed wheel the radius of which from the center to the "pitch-line" is equal to the focal length of the lens, and still more advantageously from a smooth-edged disk of the same size. The wheel is fixed upon the bed or table upon which the camera turns so that its center coincides with the center of the pivot under the lens and its pitch-line consequently under the sensitive plate upon which the picture is to be taken. A rack is fixed upon the plate-holder, which gears into the wheel as the camera revolves. As the wheel is stationary, the rack and plate-holder travel forward in a direction opposite to the motion of the camera. The same means also serve to give motion to the plate-holder in those forms of apparatus in which it slides within the camera or its appended tube or box; but in this case the fixed wheel or segment of wheel must be wholly or partially within the camera, as is the disk about to be described, as shown in Plate 2, Figs. 1 and 3; or intermediate wheels must be employed similar to the arrangement to be referred to subsequently, Plate 1, Fig. 13.

It will be obvious to practical men that mechanical equivalents may be substituted for the wheel. Thus it may be of smaller size than that described, and intermediate wheels may give the required motion to the rack. The motion thus produced is superior to that obtained from the curves, even when these have been constructed with precision instead of approximately by trial, and the apparatus is more compact and portable. The motion is, however, still smoother and more equable by dispensing with the teeth of the wheel and employing in its place a fixed disk or pulley with a smooth edge. A cord or strap is attached at one end to the disk and at the other to the plate-holder. As the camera revolves the cord or strap winds upon the edge of the disk, drawing forward the plate-holder for a distance equal to the segment of the arc of the circular edge of the disk upon which the cord or strap has wound itself. The radius of the disk must therefore be equal to the focal length of the lens, as has been said; or the cord or strap may be attached at each end to the disk, respectively, and be passed over four rollers carried by rotating camera, as shown by Fig. 5. The plate-holder is fastened to the cord or strap, and slides backward or forward, according to the direction in which the camera carrying the rollers rotates. Motion in both directions may also be obtained by using the cords or straps attached at each end to the disk and plate holder, respectively, or to the disk and to a rod or bar to which the plate-holder may be fastened. (See Fig. 7.)

We have described a cord or strap as forming the connection between the disk and the sliding plate-holder; but it will be obvious to practical men that several mechanical equivalents may be substituted, some of which, with their application, will be shown subsequently after the details of the apparatus have been described.

Our third improvement consists in adding a fly-wheel or other regulator to the gearing for working all forms of panoramic cameras, by which a much greater uniformity of motion is obtained. We find that the due exposure of the plate, when employing wet collodion or other quick-acting processes, is obtained with great difficulty by hand, especially when the so-called "instantaneous" pictures are required. We also find the use of hand-gearing tiresome and fatiguing when the dry plate or other slow-acting processes are used. We therefore adapt a spring, weight, or other prime mover to give motion to the apparatus. In this case the motion may be invariable or variable. An invariable motion may be obtained by a fly-wheel, fly-escapement, governor, or other known means of obtaining motion at a fixed rate. Such motion has already been suggested for moving panoramic cameras, but is useless unless accompanied by some method of adjusting the amount of light with great nicety, for as the time of exposure is constant, being determined by the uniform rate of motion of the apparatus, the amount of light admitted must vary inversely with its intensity. The ordinary diaphragms are insufficient for the purpose. We use the sliding diaphragms, to be described subsequently. A variable motion may be given to the apparatus proportionate to the amount of exposure required by a fly or vane the arms of which may be set at a varying angle or by a pendulum with a shifting bob or by other known means of adjusting motion. We prefer for this purpose a hydraulic apparatus, which, with other modes, will be subsequently described.

Plate 1, Fig. 8, represents the expanding diaphragm which we use for regulating the amount of light in panoramic cameras moved at a uniform rate. It consists of two plates of metal, $a$ and $b$, moving over each other by means of a small pinion, $d$, placed between them and gearing into two racks fixed in front of $a$ and behind $b$. The shaft of the pinion and the plates are maintained in position by the box $c$, which can be dropped into a recess in the lens like that used for Waterhouse diaphragms. The plates have an opening in each, as shown in the drawings, and the size of the opening is indicated by a scale on the plates projecting above the top of the box, the width of the diagonal of the opening being measured by the position of the plate $b$ above the bottom of the scale, or, if the size of the pinion be made to correspond with the size of the opening in each plate, the head of the shaft by which the pinion is moved may be divided for the purpose of indicating the amount of aperture. In both cases the amount of light will vary as the square of the opening indicated.

Figs. 9, 10, 11 show the parts of the expanding diaphragm which we employ between the lens and the sensitive plate for the purpose of regulating the form and dimensions of the aperture by which the light is admitted to the plate brought gradually past this aperture during the rotation of the camera.

It is well known that much less exposure is necessary for a picture of the sky in order to mark the delicate gradations of its clouds than for the foreground of a landscape, and various contrivances have been adopted for varying the exposure of sky and ground when taking landscapes with ordinary cameras. Now, in our panoramic camera this can be regulated with great nicety by making the opening of the diaphragm in question opposite to the image of the sky and ground on the plate correspond to the relative amount of illumination in each and by making the transition from one to the other gradual. As the position of the horizon varies with each landscape and the position of the camera, it is necessary for the form as well as the dimensions of the opening in the diaphragm to vary accordingly. This may be effected by cutting out a card to be used as a diaphragm for each picture; but we effect this as follows:

Fig. 9 is a front and edge view of a small frame, made of a sheet of zinc turned up at the edges, and having an oblong opening in the middle. Fig. 10 is two slips of zinc, which slide horizontally between the edges of Fig. 9, their distance asunder determining the ratio of the narrow to the wide space between them, and consequently the relative amount of exposure of ground and sky, for, as will be obvious, the narrow space will be opposite the image of the sky and the wide to that of the ground. So arranged, the diaphragm would only serve for pictures in which the horizon should pass through the curved part of the slips. To extend its use to other views, in which the horizon is lower than this, we use the pieces shown in Fig. 11. These slide vertically in the grooves formed by the turned-up edges of 10, and by these the proportion of the height of the narrow space to that of the broad can be changed at will within certain limits. For views in which but very little sky is shown the diaphragm must be modified so that the height of the narrow space on the slips, Fig. 10, may be less than that shown. Good effects are likewise produced by making the diaphragm of two slips only, with straight edges, but inclined to each other, so that the opening at the top (opposite the foreground of the picture) may be much wider than at the bottom, (opposite the top of the sky.) These may be made to move toward each other by a pinion, as in the diaphragm described under 5, and this will then serve to regulate the amount of exposure as well as the other.

Having described in general terms our improvement in panoramic cameras, we now proceed to give detailed instructions for applying the same in practice, reference being made to the annexed drawings.

Plate 11 represents the detailed construction (half size) of a camera of the form of that shown on Plate 1, Fig. 2, fitted with a four-inch lens and calculated to take a picture eight inches long— that is, of one hundred and fifteen degrees or nearly one-third of the horizon. Fig. 1 is a vertical section of the camera through A B. Fig. 2 is a section through C D; Fig. 3, a section of the tube and plate-holder through E F, the rest of the remaining parts being shown in plan. Fig. 4 is a partial section through G H of the base containing the apparatus for giving motion to the instrument. $a\,a$ is the lens in its mount, screwed into the sliding point of the camera proper, $b\,b$, in the usual way. $c\,c$ is the tube or box forming the back of the camera, and in which the plate $d$, carried by the plate-holder $e\,e$, slides upon the carriage $f\,f$. The whole is mounted upon the pivot $g$ and the rollers $h\,h$. The latter run on the surface of the segment of the disk $i\,i$. The edge of this disk gives motion to the carriage $f\,f$ upon which is the plate-holder $e$, by means of the cords of gimp or other material, $k\,k'$. The cords $k\,k'$ are fixed at one end to the disk $i$ and at the other end to the carriage $f$, crossing each other at the center of the disk $i$. The motion of the carriage is facilitated and its true position in the tube $c$ determined by the rollers $l\,l$ and the two springs $m\,m$. The plate-holder is fixed to the carriage by means of the pointed piece of brass $n$ and the bolt $o$. The plate-holder or dark-slide is constructed precisely like those in common use, with the exception that the shutter which keeps out the light from the plate in front of the slide has two narrow projecting pieces at its end, (shown by the dotted lines in Fig. 2,) which prevent the slide from leaving the groove in which it runs when it is drawn out to the fullest extent required. When the shutter is closed these pieces project beyond the slide, as shown in the same figure. Two small rollers are placed at the top of the slide and a spring at the back of it to keep it in its position in the tube $c$. Between the "camera proper," as we call $b\,b$, and the tube or box which forms the back of the camera the expanding diaphragm shown by Plate 1, Figs. 9, 10, 11, is fixed, sliding through a slot in the top of $b\,b$.

The parts just described, the pivot $g$, and disk, being supported upon a board or plate, constitute all that is necessary for the working of the instrument, provided that the motion is given by taking hold of it with the hand and drawing it round its pivot. We will therefore proceed to describe the adjustment of the instrument and the mode of using it in its simplest form before noticing the parts for rendering the motion more uniform and steady.

The first step in adjusting the instrument is to determine the focus of the lens employed for objects at a distance of about one hundred feet, for it will be observed that with this form of the instrument there is no means of adjustment for focus, the lens being set to objects in the middle distance, and when the objects are in different planes a small stop being used. Having carefully determined the focus for this distance in the usual way, which we will assume to be four inches, the camera must be so constructed that the sensitive plate is placed at that distance from the lens. The last adjustments of this may be effected by adjusting the position of the rollers $l$ in front of the plate-holder $e$ and carriage $f$. These may be more or less sunk into the holder and carriage, so as to bring the former near to or farther from the lens, the springs $m$ causing both plate-holder and carriage to bear upon the rollers in front, riding upon the side of the tube $c$; or the lens may slide in the outer tube, on which it is mounted, as is usual. The camera may be made somewhat too short and the lens be drawn out to the true focus, at which point it may be fixed by a small screw tapped into the outer fixed tube and entering a hole in the inner one. Having adjusted the position of the sensitive plate at the true focus of the lens, the segment of the disk $i$ is turned in a lathe so that the radius of the disk from the center to the edge upon which the cord winds is exactly equal to the focus of the lens as determined. The next step is to place the camera upon the pivot $g$ in such a position that a line drawn through the center of the pivot shall pass through the optical center of the lens. In order to effect this the brass socket $g'$, which fits the pivot $g$, is fixed temporarily under the camera by screws smaller than the holes in the flange of the socket, or by any other mode. The camera is then placed before some well-defined object, and its image is projected upon a ground glass placed behind the lens, the door $c'$ in the tube $c$ being opened for this purpose. The relative position of the camera and socket $g'$ is shifted until the image of the test object is perfectly stationary, while the camera is moved upon the pivot. When this is effected the screws are fixed and the socket is prevented from shifting by a steady pin. The camera is now in its right position. It remains only to fix the disk so that its center shall coincide with the center of the pivot. This is easily effected by a pair of dividers. The cords are then attached to the disk and carriage in such a manner that when the camera is in the center of the disk the carriage is in the center of the tube at the back of the camera, which is the position shown in the drawings.

It is evident from the construction that if the camera be moved round its center from right to left the cord $k$ will unwind off the disk and the cord $k'$ will wind upon the disk, drawing the carriage and plate-holder from left to right; and if the camera be made to rotate from left to right the cord $k$ winds upon the disk and the cord $k'$ unwinds, moving the carriage and plate-holder from right to left.

We will now proceed to show the manipulation required to take a view with a camera of this construction in its simplest form.

The sensitive plate having been placed within the dark-slide or plate-holder in a dark room or tent, the camera is placed in the position shown at $a$ in Fig. 1. The doors $c'$ and $c''$ of the tube $e$ are opened and the plate-holder is placed upon the carriage, the brass pin $n$ entering into a hole in the plate-holder and the bolt $o$ being shut. The pin $q$ is passed through the head or projecting part of the shutter of the plate-holder and the doors $c'$ $c''$ are closed. The camera is then pushed by hand and made to rotate, the slide making its corresponding motion in the opposite direction; but its shutter, being retained by the pin $q$, remains stationary, and thus exposes the plate $d$ to the rays of the light passing through the lens and the diaphragm $p$. At half the course to be traversed the relative position of the plate and camera is that shown by the drawings. At the end of the course the relative position is shown by Plate 1, Fig. 1, $c$—that is, the slide is entirely driven out with the exception of the narrow projecting parts shown by the dotted lines in Plate 2, Fig. 2. The view is now taken and the plate has been removed out of the action of the light from having passed the opening of the diaphragm $p$. The lens is then covered by its cap, and the motion is reversed until the camera is in the position shown by Plate 1, Fig. 1, $a$. The slide, having been retained in the groove by the projecting parts, now returns to its original position, the plate-holder or dark-slide is covered, and the plate protected from light. The pin $q$ is then withdrawn, the door $c''$ opened, the bolt $o$ raised, and the plate-holder withdrawn, in order that the plate $d$ may be carried to the dark room or tent to be developed.

Such is the manipulation required on the simplest form of the panoramic camera; but it is found in practice that a sufficiently equable motion cannot be obtained by moving the camera round its center by hand.

Instead of a plate or board for supporting the pivot $g$ and the disk $i$, a box, $r$ $r$, is substituted, the pivot $g$ is continued so as to form an arbor or shaft, the bottom of which is inserted into the plate $s$. The arbor carries a wheel, $t$ $t$, which gears into a screw or spiral, $u$, in connection with the shaft $v$, moved by the winch or handle $z$. On turning the handle the screw slowly rotates, drives round the wheel $t$, and a more uniform motion is produced than can be obtained when the camera is moved directly by hand. A still greater uniformity of motion is produced if a fly-wheel be added, moving at a high velocity. This is effected by attaching a cog-wheel, $w$, to the shaft $v$, which gears into the screw upon the vertical shaft $x$. On the top of the shaft is placed a fly-wheel, $y$, which greatly adds to the uniformity of the motion and continues it for some seconds after the hand is withdrawn.

We now proceed to show several modes of producing the rotation of the camera by a spring or weight. The drawings show the application of the latter only; but all the arrangements for regulating the motion are applicable to both.

We will first show means of producing a uniform rate of motion. A spring may be placed upon the arbor or shaft $g$, immediately above the wheel $t$, and as only part of a revolution is required the motion of the spring is sufficiently regular without a fusee. The screw $u$ must be made of such a pitch that it may be driven by as well as drive the wheel $t$. If the proportions of the spring are adjusted to the weight of the fly-wheel and its speed, a uniform motion is effected by this arrangement alone; or the fly-wheel may be replaced by a fly; or the shaft $v$ may be extended across the box forming the base, and an escapement with a short pendulum may be fixed upon it, which will serve the purpose when the exposure is not too rapid. We prefer a falling weight for the flat-plate camera. This may be applied conveniently by coiling a string upon the barrel $z$, attached to the winch. The end of the string may be attached to the stud 1 when the pitch of the wheel and size of the barrel $z$ cause the fall of the weight to exceed the height at which the camera is placed. This is not required with the size of the wheel and barrel shown in the drawings.

As has already been said, the uniform rate of motion is useless unless accompanied by an arrangement for adjusting the amount of light. The lens must therefore have an arrangement like that used for Waterhouse's diaphragms, into which the expanding diaphragm, Plate 1, Fig. 8, is inserted, and by which the exposure may be regulated with the greatest accuracy. The speed of the rotation must be sufficiently slow to give pictures with light of low intensity when using the largest aperture the lens admits of. Every increase of this intensity will then require the aperture to be reduced in a corresponding ratio—that is, the rate of motion or time of exposure is constant, and the aperture, and consequently the amount of light admitted, varies inversely with its intensity.

We now proceed to show the mode of producing variable motion with the apparatus and of adjusting it to the amount of light, the ordinary diaphragm being used with the lens—i. e., the amount of light admitted is constant, and the speed, and therefore the time of exposure, is inversely proportionate to the intensity of the light. A spring or weight is used, as before; but the fly-wheel $y$ is replaced by the fly, Plate 1, Fig. 15. The arms of this fly turn in the boss, and can be fixed at any angle by the set-screw so as to occupy the position $a$ and $b$ or any intermediate position. The resistance is therefore variable and the speed proportionate to that resistance. The range of variation may be extended by altering the size of the weight, which for this purpose, and for the sake of portability, may be an india-rubber bag containing a quantity of water, which may of course be increased or diminished to effect the adjustment of the speed; or for slower motion an escapement and a pendulum with a shifting bob may be fixed upon the end of the shaft $v$. A change in the rate of motion is effected by sliding the bob up or down the stem, which should be properly divided for that purpose. Such an escapement is shown by Plate 3, Figs. 1, 6, 7, 8.

Fig. 4, Sheet 2, shows a section of the hydraulic apparatus, which we also employ for regulating the motion. 2 2 is a piece of telescope-tube, closed at each end by a screwed plug and at one end by the disk 3, in which is a hole fitted with a carefully-turned conical plug, 4. The stem of the plug is screwed into the gland 5, and is made tight by packing at the bottom of the gland, constituting a stuffing-box. Communication is made between the two ends of the tube by means of the small tube 6. Two pistons, 7 7, each formed of a cup of leather, slide within the tube and are joined together by a strip of metal, 8, cut at one side, as a rack gearing into the wheel $t$. The spaces between the ends of the pistons and the ends of the tube are filled with ore or other fluid, and are in communication with each other by the tube 6. This communication can be cut off, either wholly or partially, by means of the conical point and plug 4. If a fixed pressure be brought to bear upon one of the pistons by means of the rack and wheel, then the rate at which the liquid flows from one end to the other can be regulated by the raising or lowering the plug 4 by means of the screw on its stem, which thus enlarges or contracts the area of the orifice in 3, and as the wheel $t$ is fixed by the arbor $g$ to the camera the motion of the latter is determined by the rate at which the liquid flows.

Plate 3, Figs. 1 and 4, shows another mode of producing variable motion in the camera with a considerable range. The pivot $g$ of the camera has a toothed wheel, 1, fixed upon it, which gears into the pinion 2, on the arbor of which is fixed a light wooden or metal disk, 3, fitted accurately, so as to turn true. A square shaft runs parallel to it, its pivot being fitted at one end into the step which supports the pivot of the shaft carrying the disk 3, and a collar at the other end passing through the side of the box supporting the camera, (shown in the drawings as made of light metal.) Upon this shaft the small pulley 4 is placed, which slides to and fro upon the shaft, and can be set at any position by means of the rod and guide $g$. The shaft 3 being square, and the opening in the pulley also square, the latter is driven by the former, the velocity being determined by the distance of the pulley from the center of the disk. If the radius of the disk be accurately divided and set off upon the rod $g$, the velocity may be determined at will.

For quick exposures the end of the shaft 5 is fitted with a fly-wheel or a fly with shifting arms to still further extend the range of the speed. For slower speeds the escapement shown in the drawings is attached, the rate of the maximum or minimum speed being determined by the number of teeth in the escapement-wheel. This will of course depend upon the focal length of the lens, the nature of the process employed, &c.

The apparatus shown in the drawings is moved by a weight and string coiled on the edge of the disk 3, passing over a pulley in the side of the box. Instead of this, a coiled spring may be placed upon the shaft $g$; and we prefer this arrangement for the circular-plate camera. When the fly-wheel is used a small stud upon it serves as a handle to wind up the apparatus and reverse the motion; but when the escapement is used the pulley 4 must be pushed off the disk and the camera itself moved round. In all these arrangements provision must be made to arrest the camera when wound up, which may be done by a loop and string, a pin dropping into a hole in the disk or table, or a latch and pin. The pulley is then placed upon the disk at the required position, the loop or pin removed, when the camera will travel at the required velocity. To enable the pulley in this and the subsequent arrangements for moving the plate-holder about to be described to bite upon the plate, its rim should be formed of leather or india-rubber. This yields and forms a flattened edge upon the disk, and effectually prevents slipping.

Before proceeding to the portable form of panoramic camera, (shown by Plate 3,) we will describe some of those other modes of obtaining motion from a disk or pulley to which we have already alluded. (See Plate 1.) We find, for instance, that we may substitute a slip of india-rubber fixed upon the carriage or plate-holder, instead of the cord or strap we have described. Plate 1, Fig. 12, shows this arrangement. *i* is the disk, as in Plate 2; *f*, the carriage, and *e* the plate-holder. A strip of india-rubber or other flexible material is shown by the thickened line upon it. This is pressed upon the edge of the disk by means of rollers upon the back of the carriage, and it then moves on the rotation of the camera as the rack upon the fixed toothed wheel.

Fig. 13 shows another modification by which the toothed wheel or disk may be entirely out of the camera, the communication being made by two pulleys or cogged wheels, according as the disk or wheel is used to transmit the motion from the disk or wheel without to the carriage and india-rubber slip or rack within; or the wheels may run upon the surface of the disk, the true position being determined by the distance at which the acting part of the pulley, covered, as before, with leather or india-rubber, is placed from the pivot to the camera. This must be determined by trial. If the disk, which may then be the top of the supporting-box, be large enough, this arrangement admits of the camera being drawn back for focusing near objects or to receive a lens of longer focus. This arrangement is shown in greater detail in Plate 3, on which Figs. 1, 2, 3, 4 are views of the portable camera. 1 is a vertical section through A B; 2, an elevation of the back of the camera; 3, partly a plan, partly a section, through E F; and 4, a plan of the supporting-box with its lid removed, showing the apparatus already described. The same letters refer to the same parts of the camera as in Plate 2.

It will be seen that the tube *c* of Plate 12 is replaced by the short frame or support *c* of Plate 3. (Shown clearly in the section, Fig. 1, and indicated by the same letters and curved dotted lines in Fig. 2.) This frame carries three rollers, *l l l*, on the bottom, the middle one of which is in communication with the friction-roller *k*, deriving motion from the disk, which in this case is the top of the metal box, the length of its course being adjudicated by its distance from the pivot. Another roller is fixed on the top of the frame by means of two strips of brass, fixed to the frame at one end by a screw, upon which it turns as upon a center, and at the other by a pin or thumb-screw. On removing the pin or thumb-screw the roller can be raised, so that the plate-holder or dark-slide can be placed upon the lower rollers when the top roller is lowered and the position of the plate-holder secured, the rollers fitting into grooves in its top and bottom of the plate, so as to retain it laterally. The length of the dark-slide is extended at each end by wider stiles, so that it may be in gear with the rollers before the plate comes in front of the opening in the camera. It is closed by a flexible shutter twice the length of the dark-slide. Upon the center of the shutter a flange, *f*, is fixed, which enters into the opening of the camera when the dark-slide is inserted between the rollers. This prevents the forward motion of the shutter when the camera rotates, the dark-slide alone moving forward and bringing the plate opposite the flange and opening in the camera. At the commencement of the operation the flange is opposite one of the wide stiles of the dark-slide or even somewhat overhanging it. We prefer to make the inner surface of the flexible shutter of velvet, which effectually excludes the light at the ends of the dark-slide. The adjustment and manipulation with this camera are similar to those of the other, except as to the insertion of the slide. We have shown this camera worked with a vertical roller on the horizontal surface of the disk; but the other modes of obtaining the motion of the plate to the rotation of camera may also be employed, as will be obvious to any workman.

The form of the apparatus may be modified, so as to pack into still smaller space, by substituting a board for the camera *b b*, in which *c* slides. The board, which is like the base-board of an ordinary camera, is fixed upon the pivot *g* in front and upon a pair of rollers behind. The lens is screwed upon a board with a sliding front, and is clamped by screws in a vertical position over the pivot. It is jointed to the frame which carries the rollers, driving the plate-holder by a bellows or other collapsing camera-body. The frame is clamped upon the base-board at the focal distance of the lens. On the clamps being unscrewed, the frame, lens, board, and bellows-body can be packed in a very small space.

The camera shown in Plate 1, Fig. 1 can be mounted with advantage in a base-board of this kind, on which must be placed rollers to allow the box containing the slide to traverse laterally while the base-board and lens rotate.

All the improvements which we have described for giving more uniform motion to the apparatus and for regulating the exposure and the amount of light to different parts of the picture are applicable to the circular-plate camera with a rotating lens, as well as to the flat-plate camera. The circular-plate or Martien's camera is described in several works of photography usually as applied to be used with curved daguerreotype plates. This form may be used for sensitive paper and other processes on a flexible material by using talc, gutta-percha, &c., by using a thin plate of metal having a narrow frame of metal attached to it by a hinge. The paper or other flexible material is placed between the plate and frame, and the latter is fastened to the former, retaining the paper straight between them. The whole may then be treated as a daguerreotype-plate and bent to the proper curve in the camera; or the paper or other material may be upon rollers and be stretched over the back of a curved frame, a portion brought forward for each view. For glass plates a dark-slide must be attached, as in the ordinary camera, but made of the proper curve. The narrow tube, which rotates in this camera and limits the angle of the rays acting upon the plate, must be fixed upon the pivot under the lens, instead of the camera itself, in the flat-plate arrangement. The end of the rotating tube must be fitted with our expanding diaphragm, and if a fixed rate of motion be employed the lens must have our expanding diaphragm in front of it. As the force required to cause the inner tube to revolve is much less than that required for the various moving parts of the flat-plate camera, a weak spring fixed on the pivot $g$ is sufficient to give the motion. If the arrangement shown in Plate 3 be used for giving motion to the tube, an arrangement must be made for rewinding the spring. This should be attached to the rest of the apparatus by a ratchet, so that the spring and shaft may extend through the top of the fixed camera and a key or thumb-screw be there applied for winding the spring and moving back the rotating tubes.

Plate 4 represents three different views of a camera worked by clock-work, Fig. 1 being a plan of the same; Fig. 2, a front elevation; and Fig. 3, a lateral elevation, partly in section. A is a metallic stationary disk, on which the camera revolves; B, the camera, and C the traveling box in which the plate-holder D is inserted. In this description of apparatus the requisite rotary motion is imparted to the camera and box by means of clock-work placed within the former, and the translating motion of the box is derived by cords coiling and uncoiling round the disk, as previously described. The camera rotates round the pin $a$, fixed in the center of the disk, and is supported by three small pulleys, $b\ b\ b$, running on the upper surface of the disk, and rotary motion is imparted to the same by clock-work contained in the case $c$, which drives the small pinion $d$, gearing into fine teeth cut on the inner surface of the disk, or, instead of teeth, the pinion and surface of disk may be milled. $e$ is the key for winding up the clock-work, and which should be taken off when the camera is at work; $f$, the fly for regulating the speed of the clock-work; and $g$ a small transversal rod, provided with an external button, $h$, for arresting the motion of the clock-work, by means of an upright wire, $i$, which by rotating the button can be brought within the circle described by the fly, and thus arrest its motion. The clock-work contained in the case $c$ is attached to a plate, $k$, adjusted in the slides $l\ l$. When the camera is at work the pinion $d$ is maintained in contact with the ridge of the disk by the elastic spring $m$, which passes round the post $n$, fixed in the camera, and the ring $o$, fitted on the plate $k$. The clock-work can be thrown out of gear by withdrawing the spring from the post $n$. $p$ is the lens, and $q$ a large door (shown open in Fig. 2) to allow of adjustment of lens, setting the fly, and winding the clock-work. $q'$ is a small door hung in the former, which is opened for operating. The prepared plate is placed in the holder D, and latter inserted within the box $c$, which is supported by its rollers $w\ w$ on the rail $x$, forming part of the camera, and to which a translating motion is imparted by the cords $r\ r$. One extremity of either is attached to the disk, while the other extremity is made fast to the legs $s\ s$ by means of the screws and nuts $t\ t$. The image is refracted through the lens on the prepared glass through an upright tube $u$, the inner extremity of which is made fast in the camera by the fork $u'$, while the outer extremity is provided with a flange, to which are attached the extremities of an endless belt, $v$, running on two upright rollers, $v'\ v'$, and encircling the plate-holder.

We claim as our invention—

1. The improved construction and arrangement of the parts of the flat-plate camera, so that their motions are smooth and equable and free from vibration, and so that the whole apparatus is rendered more compact and portable than those previously suggested.

2. The new mode or modes of obtaining the relative motions of the lens and sensitive plate, such motion being obtained directly by mechanical means or by appliances constructed mechanically instead of by guide curves or grooves formed by trial, as has heretofore been proposed to be done.

3. The improvement in the gearing when working both forms of camera.

4. The application of a spring or weight to give motion to such cameras, and of means for regulating such motion to such cameras, and of means for regulating such motion both at variable and invariable rates.

5. The application of an expanding diaphragm to regulate the exposure in cameras moving at an invariable rate.

6. The expanding diaphragm placed between the lens and the sensitive plate, by means of which the sky and cloud effects may be obtained, and by which the amount of exposure may be regulated.

7. The general mechanical arrangements by which these improvements are carried into effect in different forms of cameras described.

J. R. JOHNSON.
J. A. HARRISON.

Witnesses:
G. F. WARREN,
JOHN DEAN,
Both of No. 17 Gracechurch Street, London.